(No Model.)

A. WRIGHT.
WHEELWRIGHT'S TOOL.

No. 275,742. Patented Apr. 10, 1883.

Witnesses:
E. M. Johnson
W. B. Masson

Inventor
Alexander Wright

Attorney.

UNITED STATES PATENT OFFICE.

ALEXANDER WRIGHT, OF POTSDAM, NEW YORK.

WHEELWRIGHT'S TOOL.

SPECIFICATION forming part of Letters Patent No. 275,742, dated April 10, 1883.

Application filed January 18, 1883. (No model.)

*To all whom it may concern:*

Be it known that I, ALEXANDER WRIGHT, a citizen of the United States of America, residing at Potsdam, in the county of St. Lawrence and State of New York, have invented certain new and useful Improvements in Tools for Wheelwrights' Use; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to a tool for forming on the ends of axle-spindles the pins, which are afterward screw-threaded to receive the nuts which hold the hubs or axle-boxes in place, its object being to provide a convenient and reliable tool which may be readily used either for reducing the spindles of new axles or for shortening old spindles which have been broken, and adapting them to receive new hubs or hubs of smaller size than those which they were originally intended for.

The invention consists in certain novel combinations of devices, which will be hereinafter fully described, and pointed out in the claim.

Figure 1:
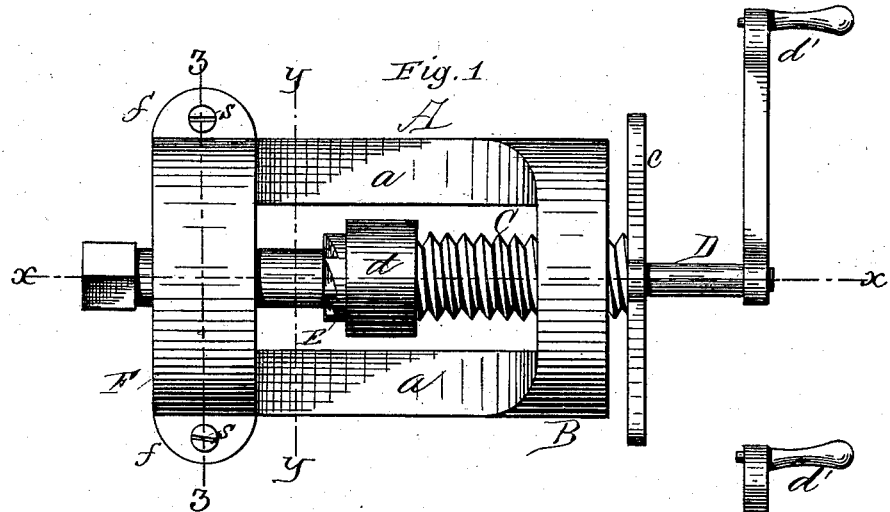
Figure 2:
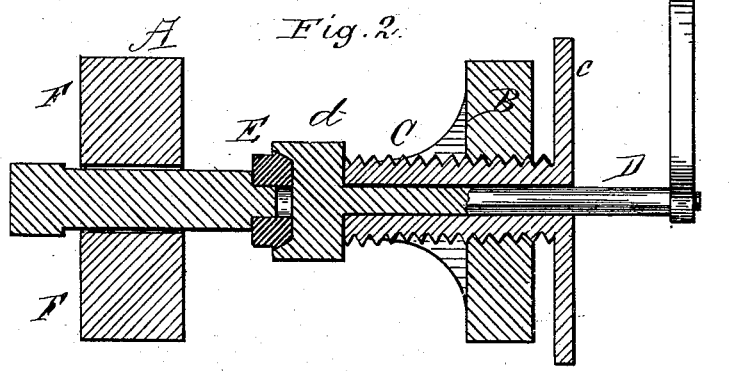
Figures 3, 4:
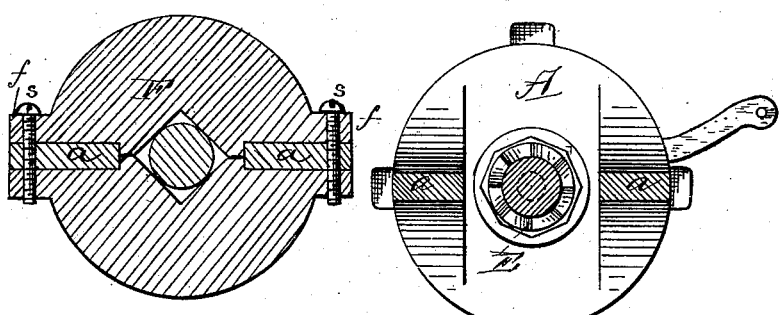

In the accompanying drawings, Figure 1 is a side elevation of my improved tool clamped to the spindle of an axle and ready for use. Fig. 2 is a central section in a plane parallel to the plane of elevation of Fig. 1. Fig. 3 is an inner end view of the tool; and Fig. 4 is a sectional view, taken through the line $z\ z$ of Fig. 1.

The letter A indicates the main supporting-frame, consisting of two arms, $a\ a$, projecting in the same direction from a base-piece, B, which has a centrally screw-threaded aperture to receive a hollow screw, C, provided with turning arms $c$ at its outer end. Within this hollow screw turns a rotary shaft, D, carrying at its inner end a head, $d$, having an inwardly-tapering angular socket to receive a removable cutting-burr, E, the exterior of which corresponds in shape to the socket, so that it will fit snugly without turning therein. The outer end of the shaft D is provided with a crank, $d'$, by which it may be turned.

The letters F F indicate clamping-pieces which are to clamp the spindle and hold the tool in position for work. These clamping-pieces are provided with ears $f$, by which they are secured to the ends of the arms $a$ by means of screws $s$, which pass through the ears and arms and serve to draw the clamping-pieces together. The clamping-pieces are provided in their facing-edges with V-shaped notches directly opposite each other, and forming together the socket which is to embrace the spindle to be operated upon. The burr E may have its central passage of any size to which it is desired to cut the pin on the spindle, and may have this passage provided with any suitable kind of cutting devices for operating upon the spindle, and interchangeable burrs may be used, some formed for cutting the pin plain, and others formed as dies for screw-threading said pin.

In using my improved tool I firmly clasp the spindle between the clamping-pieces, which, owing to the shape of their notches, will clamp and hold securely a spindle of any size. I then insert the burr E in its socket and screw in the hollow screw, which drives the head of the rotary shaft inward, and thus brings the burr concentrically against the end of the spindle, as shown in Fig. 2. I then turn the crank of the rotary shaft, causing the burr to rotate, and cut the end of the spindle down to the proper size, or form a screw-thread thereon, as the case may be. While turning the rotary shaft I also, as the occasion requires, drive in the hollow screw, so as to feed the burr forward with the proper degree of pressure.

I of course do not confine myself to the precise shape of the various parts of my tool as shown, but reserve to myself the right to alter or vary all or any of the parts, or substitute equivalent devices therefor, and generally to construct the tool as a whole in such manner as will best carry out my invention according to its tone, scope, and spirit.

Having now described my invention, what I claim is—

A tool or implement for forming and reducing the shoulders of wagon-spindles, as set forth, consisting of the frame A, with arms a a, base B, screw-threaded, as shown, and end clamp, with V-shaped openings, in combination with the hollow set-screw C and rotary shaft D, provided with end socket for the reception of a burr, E, the parts being organized substantially as shown.

In testimony whereof I affix my signature in presence of two witnesses.

ALEXANDER WRIGHT.

Witnesses:
 TRUMAN JONES,
 SAMUEL C. CRANE.